April 19, 1960  J. C. CARR, JR  2,933,315
TOY FISH
Filed June 13, 1957

Jesse C. Carr, Jr.
INVENTOR.

BY *Lawrence A. O'Brien*
*and Harvey B. Jackson*
Attorneys

United States Patent Office 2,933,315
Patented Apr. 19, 1960

2,933,315

TOY FISH

Jesse C. Carr, Jr., Poplar Hill, Va.

Application June 13, 1957, Serial No. 665,474

3 Claims. (Cl. 273—1)

The present invention generally relates to an amusement device and more particularly to a toy fish wherein the actual fishing operation is closely simulated so that children may be entertained and also develop certain skills in the art of fishing by employing the present device.

An object of the present invention is to provide a toy fish disposed in submerged relation to the water having articulated driven jaws which alternately open and close together with a hook member for positioning between the jaws whereby the fish may be moved upwardly out of the water if the fishhook is operated properly.

Another important object of the present invention is to provide a toy fish having means for agitating the fish for movement thereof for increasing the dexterity necessary in engaging the fishhook with the jaws.

Other objects of the present invention will reside in its simplicity of construction, ease of assembly, entertaining qualities and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
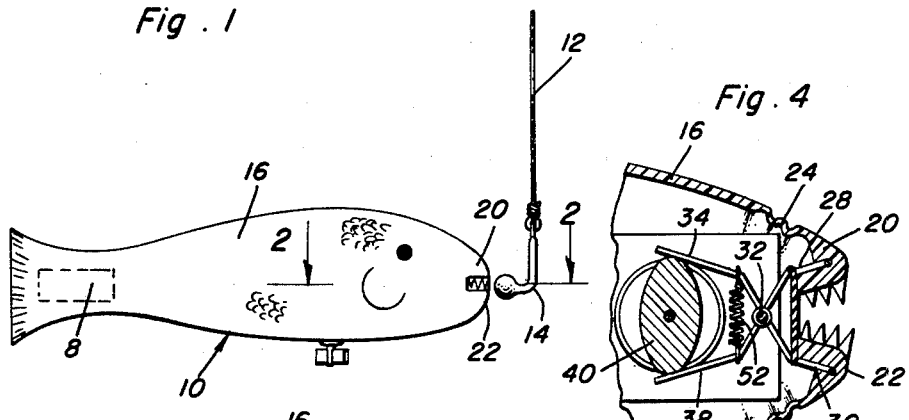
Figure 1 is a side elevational view of the toy fish of the present invention.
Figure 4:
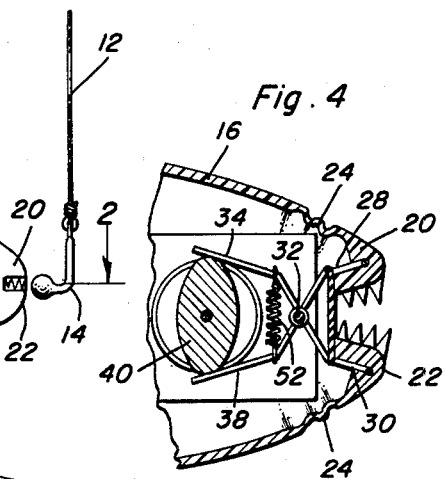
Figure 4 is a detailed sectional view showing the movement of the jaws to an open position.
Figure 2:
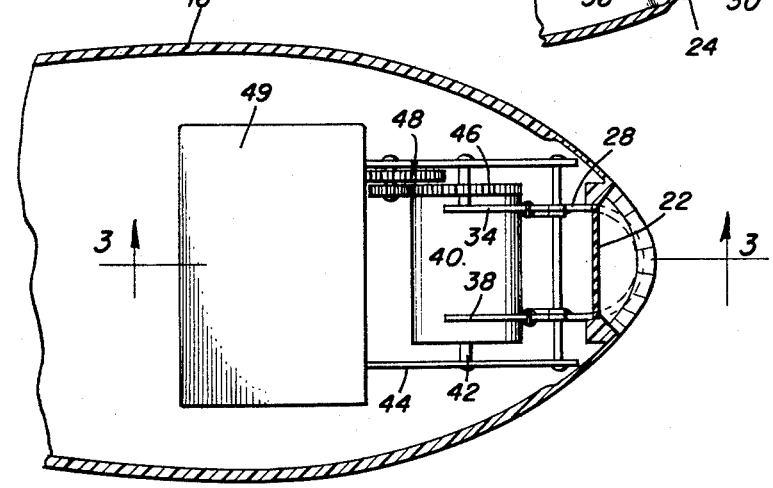
Figure 2 is a detailed sectional view on an enlarged scale taken substantially upon a plane passing along section line 2—2 of Figure 1 illustrating certain details of construction thereof.
Figure 3:
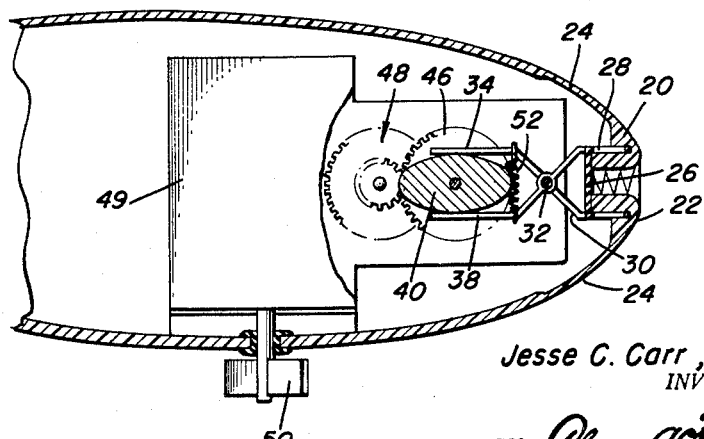
Figure 3 is a longitudinal sectional view taken substantially upon a plane passing along section line 3—3 of Figure 2 illustrating the cam operating mechanism and the spring motor therefor.

Referring now specifically to the drawings, the numeral 10 generally designates the toy fish of the present invention which is adapted for use with a fish line 12 having an L-shaped fishhook 14 on the lower end thereof with the fishhook 14 being preferably constructed of rubber or similar material.

The toy fish 10 includes a hollow body 16 generally simulating a fish with a weight 18 adjacent the rear or fin end thereof with the weight 18 serving to balance the fish 10.

The forward end of the body 16 is provided with an upper jaw 20 and a lower jaw 22 connected to the end of the body 16 by a flexible member 24 such as a rubber diaphragm or the like. The inner ends of the jaws 20 and 22 are provided with a resilient closure member 26 which prevents entry of water into the interior of the body 24 which is also prevented by diaphragms 24.

An arm 28 is rigidly connected to the jaw 20 and an arm 30 is rigidly connected to the jaw 22 with the arms 28 and 30 being disposed in crossed relation and supported by a pivot pin 32. The free ends of the arms 28 and 30 on the opposite side of the pivot pin 32 have substantially parallel and horizontally extending portions 34 and 38 for engagement with an oval shaped cam 40 mounted on a transverse shaft 42 supported in brackets 44. The end of the cam 40 is provided with an enlarged gear 46 for driving through a reduction gear mechanism 48 whereby a spring motor 49 may be employed for operating the cam 40 by storing kinetic energy in the spring by turning a windup key 50 which may be removable but which is shown as being disposed below the body 16 whereby rotation of the key 50 will cause agitation and movement of the body 16 thus increasing the difficulty in engaging the member 14 between the jaws and simultaneously pulling on the line 12 for landing the fish 10 by pulling the same from the water. It is pointed out that the construction of the present device is such that it will sink in water to a predetermined depth and will substantially maintain this depth with the only propulsion force being provided by the rotating key. Also, a spring member 52 is provided between the arms 28 and 30 at the inner ends of the parallel portions 34 and 38 for urging the parallel portions 34 and 38 into engagement with the cam 40, thus effectively sealing all portions of the interior of the application. Also, it is pointed out that the device may be constructed of any suitable material such as plastic or the like and may be employed in conjunction with water in bathtubs, portable pools or any other similar body of water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An amusement device comprising a hollow body floatable in submerged relation in water, said body having the shape of a fish, a spring motor disposed within the body, a wind-up key disposed exteriorly of the body and connected with said motor for manual winding of the motor and being driven by the motor during unwinding thereof thereby causing movement of the body in the water, a pair of jaws, means pivotally mounting said jaws on one end of said body for movement toward and away from each other and including opposite extensions on said jaws operative to move said jaws away from each other, spring means interconnecting the jaws urging the jaws towards each other, cam means driven by said motor and engaging said extensions to intermittently operate said extensions in opposition to said spring means, a flexible fish line, and a simulated fish hook supported on the end of said line, said line being hand manipulated for insertion of the hook between the jaws when the jaws are forced apart, said line serving to jerk the body out of the water when the jaws are urged together by the spring means before the cam means forces the jaws apart and releases the hook.

2. The combination of claim 1 wherein said jaws are recessed within the end of the body, and flexible means sealingly interconnecting the jaws and body to prevent water from entering said body.

3. A toy in the shape of a fish having a hollow body capable of floating in submerged position in water, a transverse pivot member in said body, a pair of jaws pivotally mounted on said pivot member for opening and closing movement about an axis transverse to said body, means within said body operatively connected to said jaws and continuously openings and closing said jaws alternately, a manually operable hook member for insertion between the jaws when open whereby the body may be pulled from the water when said jaws are closed and clampingly engaging said member, said means for opening and closing said jaws including a spring motor having a wind-up key externally of the body and operative by unwinding of the spring motor to cause movement of said body in the water to make insertion of said member between the jaws difficult, said jaws being disposed at one end of said body, and flexible diaphragm means sealing the jaws to the body to prevent water from entering the body, said means for opening said jaws further including a spring acting to close said jaws, each of said jaws having an extension operative to open the jaws in opposition to said spring, and an oval-shaped cam member having said extensions engaging opposite sides thereof and being operative to operate the extensions and having the spring motor operatively connected thereto.

References Cited in the file of this patent

UNITED STATES PATENTS

| | | |
|---|---|---|
| 1,324,730 | Cohen et al. | Dec. 9, 1919 |
| 2,511,430 | Colaluca | June 13, 1950 |
| 2,775,846 | Gazda | Jan. 1, 1957 |

FOREIGN PATENTS

| | | |
|---|---|---|
| 64,553 | Germany | Feb. 21, 1892 |
| 978,373 | France | Nov. 22, 1950 |
| 1,055,036 | France | Oct. 14, 1953 |

OTHER REFERENCES

German application No. T 9244, printed January 19, 1956.